US012645283B2

(12) United States Patent
Olorode et al.

(10) Patent No.: US 12,645,283 B2
(45) Date of Patent: **\*Jun. 2, 2026**

(54) STATIC POWER REDUCTION IN CACHES USING DETERMINISTIC NAPS

(71) Applicant: TEXAS INSTRUMENTS INCORPORATED, Dallas, TX (US)

(72) Inventors: Oluleye Olorode, Pflugerville, TX (US); Mehrdad Nourani, Plano, TX (US)

(73) Assignee: TEXAS INSTRUMENTS INCORPORATED, Dallas, TX (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/894,180

(22) Filed: Sep. 24, 2024

(65) Prior Publication Data

US 2025/0013284 A1        Jan. 9, 2025

Related U.S. Application Data

(60) Continuation of application No. 18/450,079, filed on Aug. 15, 2023, now Pat. No. 12,130,691, which is a continuation of application No. 17/541,776, filed on Dec. 3, 2021, now Pat. No. 11,775,046, which is a continuation of application No. 16/933,407, filed on Jul. 20, 2020, now Pat. No. 11,221,665, which is a continuation of application No. 16/253,363, filed on (Continued)

(51) Int. Cl.
*G06F 1/3234* (2019.01)
*G06F 12/0811* (2016.01)

*G06F 12/0846* (2016.01)
*G06F 12/0895* (2016.01)

(52) U.S. Cl.
CPC ........ *G06F 1/3275* (2013.01); *G06F 12/0811* (2013.01); *G06F 12/0848* (2013.01); *G06F 12/0895* (2013.01); *G06F 2212/1028* (2013.01); *G06F 2212/282* (2013.01); *G06F 2212/283* (2013.01); *Y02D 10/00* (2018.01)

(58) Field of Classification Search
CPC .............. G06F 1/3275; G06F 12/0811; G06F 12/0848; G06F 12/0895; G06F 2212/1028; G06F 2212/282; G06F 2212/283; Y02D 10/00

See application file for complete search history.

(56) References Cited

U.S. PATENT DOCUMENTS 7,127,560 B2    10/2006  Cohen
7,443,759 B1    10/2008  Rowlands
(Continued)

*Primary Examiner* — Aracelis Ruiz
(74) *Attorney, Agent, or Firm* — Michael T. Gabrik; Frank D. Cimino

(57) ABSTRACT

Disclosed embodiments relate to a dNap architecture that accurately transitions cache lines to full power state before an access to them. This ensures that there are no additional delays due to waking up drowsy lines. Only cache lines that are determined by the DMC to be accessed in the immediate future are fully powered while others are put in drowsy mode. As a result, we are able to significantly reduce leakage power with no cache performance degradation and minimal hardware overhead, especially at higher associativities. Up to 92% static/leakage power savings are accomplished with minimal hardware overhead and no performance tradeoff.

20 Claims, 7 Drawing Sheets

Related U.S. Application Data

Jan. 22, 2019, now Pat. No. 10,725,527, which is a continuation of application No. 15/804,785, filed on Nov. 6, 2017, now Pat. No. 10,191,534, which is a continuation of application No. 15/431,922, filed on Feb. 14, 2017, now Pat. No. 9,811,148, which is a division of application No. 14/694,285, filed on Apr. 23, 2015, now abandoned.

(60) Provisional application No. 61/983,216, filed on Apr. 23, 2014.

(56) References Cited

U.S. PATENT DOCUMENTS

| | | | |
|---|---|---|---|
| 7,647,452 B1 | 1/2010 | Moll | |
| 8,225,046 B2 | 7/2012 | Licht | |
| 2002/0129201 A1 | 9/2002 | Maiyuran | |
| 2004/0068672 A1* | 4/2004 | Fisk | G06F 3/0634 |
| | | | 711/114 |
| 2007/0043965 A1* | 2/2007 | Mandelblat | G06F 12/0864 |
| | | | 713/324 |
| 2008/0082753 A1 | 4/2008 | Licht | |
| 2008/0120514 A1 | 5/2008 | Ismail | |
| 2010/0275049 A1 | 10/2010 | Balakrishnan | |
| 2011/0235459 A1 | 9/2011 | Ware | |
| 2011/0283124 A1 | 11/2011 | Branover | |
| 2012/0096295 A1 | 4/2012 | Krick | |
| 2014/0095777 A1 | 4/2014 | Biswas | |
| 2014/0122824 A1 | 5/2014 | Lewsey | |
| 2014/0337605 A1 | 11/2014 | Hall | |

* cited by examiner

STATIC POWER REDUCTION IN CACHES USING DETERMINISTIC NAPS

CROSS-REFERENCE TO RELATED APPLICATIONS

This application is a continuation of and claims priority to U.S. patent application Ser. No. 18/450,079, filed Aug. 8, 2023, which is a continuation of and claims priority to U.S. patent application Ser. No. 17/541,776, filed Dec. 3, 2021, now U.S. Pat. No. 11,775,046, which is a continuation of and claims priority to U.S. patent application Ser. No. 16/933,407, filed Jul. 20, 2020, now U.S. Pat. No. 11,221, 665, which is a continuation of and claims priority to U.S. patent application Ser. No. 16/253,363, filed Jan. 22, 2019, now U.S. Pat. No. 10,725,527, which is a continuation of and claims priority to U.S. patent application Ser. No. 15/804,785, filed Nov. 6, 2017, now U.S. Pat. No. 10,191, 534, which is a continuation of and claims priority to U.S. patent application Ser. No. 15/431,922, filed Feb. 14, 2017, now U.S. Pat. No. 9,811,148, which is a divisional of and claims priority to U.S. patent application Ser. No. 14/694, 285, filed Apr. 23, 2015, now abandoned, which claims the benefit of related U.S. Provisional Application Ser. No. 61/983,216, filed Apr. 23, 2014, all of which are incorporated by reference herein in their entireties.

TECHNICAL FIELD

The technical field of this disclosure relates to cache memory for data processors.

BACKGROUND

Phased caches were previously introduced as cache architecture to reduce the redundant and high-energy consumption caused by reading all data ways on every cache access even though only one of them will be used if the access hits the cache. Phased caches do not query the data arrays in the first cycle of access but rather, wait until a hit is determined before accessing the specific data way hit. This saves dynamic read energy but static energy consumption is not reduced since both the tag and data arrays are ON throughout the program execution.

The rapid increase in microprocessor speed has exceeded the rate of improvement in DRAM (Dynamic Random Access Memory) speed in recent years. This widening performance gap between processors and memories has created several challenges for computer designers since memory performance can easily become a bottleneck to overall system performance. Specifically, processor performance has been observed to increase at about 60% annually, while memory systems lag significantly behind at about 10% annual improvement. To solve this problem, designers turn to memory performance improvements which ultimately dictate the performance and power consumption of processors.

Caching is a common approach used to achieve memory system speed up, by storing data that has been recently used in faster memory. Therefore, using a larger cache could increase the access hit rate, which in turn improves processor speed but this comes at a cost—increased hardware and higher static and dynamic energy consumption.

As a result, there is usually a trade-off between energy and performance in memory system design, since not all accessed memory locations can be stored in faster memories such as caches. Current memory systems designed with SRAMs, DRAMs and/or CAMs, have not been able to catch up with processor performance. As a result, larger caches are often employed in memory systems to bridge this memory processor performance gap. While these large caches offer improved performance, they also increase the power consumed by the processor. An alternative to improve performance is associativity, but it also leads to increased power consumption due to parallel querying of multiple tags. This increasing cache power consumption resulting from the drive for improved performance, cannot be overlooked because caches contribute a significant fraction of the overall power consumed by modern processors. Several authors have concluded that cache/memory systems contribute 30-60% of the total power consumed by processors.

Reducing cache size in an attempt to save power is not an option either, because it leads to higher miss rates and effectively more energy consumption. As a result, several attempts have been made to reduce voltages and design lower power circuits to reduce the high proportion of power consumed by caches/memory systems. However, these circuit level techniques have not been very successful; rather, power dissipation levels have steadily increased with each new microprocessor generation, leading to a renewed interest in architectural approaches that reduce the switching capacitive power component of memory systems without sacrificing performance. In an attempt to save power, some researchers have directed their architectural improvements at better performance because of the observation that improved performance (i.e. less misses) usually lead to less power consumption. Others focus on power reduction techniques targeted at specific aspects of the architecture, with some trade off in performance.

SUMMARY

This invention deterministically powers ON data RAM lines or group of lines that will be accessed in the immediate future while keeping all other lines powered down. The tag RAMs remain ON to avoid any extra latency associated with powering on a tag RAM/line that is to be accessed. The data RAM on the other hand is deterministically powered ON before access with no extra latency. This is possible in phased caches because hit determination takes a minimum of 2-cycles before data RAM access. Therefore, the power-ON sequence for a set/set-group is triggered on every access to the set/group. Once the hit/miss is determined in the second cycle, all ways of the set will be ON, then power down begins for all other ways except the matched (hit/miss) way. The powered ON set/ways are kept ON until the request has been completely processed. All outstanding accesses, in all pipe stages and buffers contribute to the overall power ON state of an individual cache line or group of lines they belong. When way information becomes available, all other ways not scheduled to be read/written are also powered down if no other member of that set or power group of sets needs the way ON.

BRIEF DESCRIPTION OF THE DRAWINGS

These and other aspects of this invention are illustrated in the drawings, in which.

DETAILED DESCRIPTION

The deterministic napping technique shown in this invention reduces static/leakage power in caches by leveraging the ability to retain memory contents at low power states. This technique also takes advantage of the fact that data RAMs do not have to be read in the first cycle of cache access while the lines of the referenced set are being transitioned to full power state. These data RAM accesses can occur after tag RAM reads during hit/miss determination or even a cycle after as in phased cache architectures. Unlike conventional drowsy caches, which keep most lines of the data RAM in a low power state, and only restores full power when an access occurs to such low powered lines, the dNap architecture, maintains cache lines that will be accessed in the immediate future, in a fully powered state. This ensures accesses are never stalled while a wake up is being triggered. As a result, dNap caches do not suffer from the performance degradation incurred by conventional drowsy caches, due to accesses to a low powered line. The proposed approach is specifically focused on deterministic naps in only the data RAMs, for two main reasons. First, data RAMs are known to be much larger than the tag RAMs, therefore, they contribute a major portion of static energy. Second, cache accesses are non-deterministic and can occur at any time, starting with a tag RAM read. Therefore, the tag RAMs are always fully powered to avoid delays due to waking a napping tag line.

Figure 1:
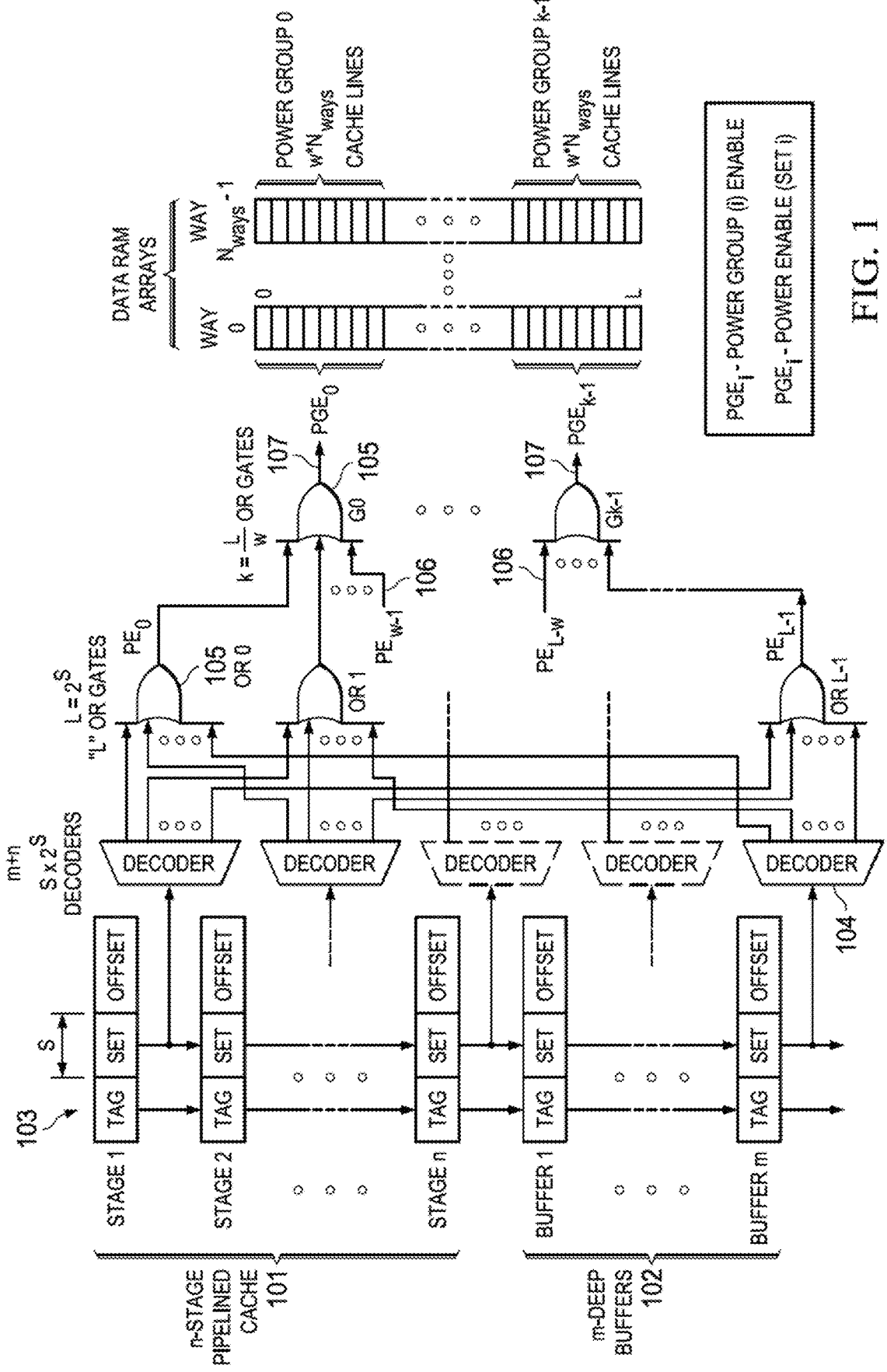
FIG. 1 shows a memory controller module.

A Memory Nap Controller (MNC) is used to track in-flight cache access to transition fully powered lines to a low power napping state. The full power transition is always completed ahead of data RAM access with no extra latency incurred at the time of access. This is enabled by delaying data RAM accesses by 1 or 2 cycles after tag RAM read depending on architecture pipe-line. All current and outstanding accesses, in all pipeline stages and buffers contribute to the overall power ON state of any individual cache line. FIG. 1 shows how S×2 S decoders are used to determine the accessed sets in different cache stages (where for each address, S is the bit-width of the address's "Set" field) and the contribution of each stage to the final power enable (PE) of each set. The n pipe-stages 101 and m buffers 102 shown in FIG. 1 typically vary by architecture. The S set bits 103 of each pipe stage, are decoded in decoders 104 to activate an L=2 S bit, one hot value representing the specific set decoded. All bits representing a set across the cache pipe-stages and buffers are ORed in gates 105 to determine which set(s) must be fully powered. For example, all bit-0s of all decoder outputs are fed into OR0 in FIG. 1 to control set 0 power (signal PE0 106). A nap is initiated when a PE transitions from 1 to 0, while wake up is triggered on a transition from 0 to 1. These transitions complete within 1 clock cycle even when waking a larger 512 KB cache. Further static power savings are achievable by transitioning all other ways to a drowsy state after hit/miss determination has chosen a single cache way. If a new access occurs to a set that is attempting to transition unaccessed ways to a drowsy state, the new access takes precedence and keeps the line fully powered. The fully powered cache lines are kept in that state until the request has been completely processed. Multiple cache lines can make a dNap power group 107 to reduce the MNC hardware overhead while taking advantage of the built-in low power feature available in custom SRAM memory arrays. For example, power groups of eight, controlled by power group enables (PGEs) as seen in FIG. 1 can be configured. This eliminates the need to use the (log 2w) LSBs of the set field in the controller logic, thereby reducing the decoder sizes and the number of OR gates significantly, leading to reduced MNC hardware overhead.

Figure 2:
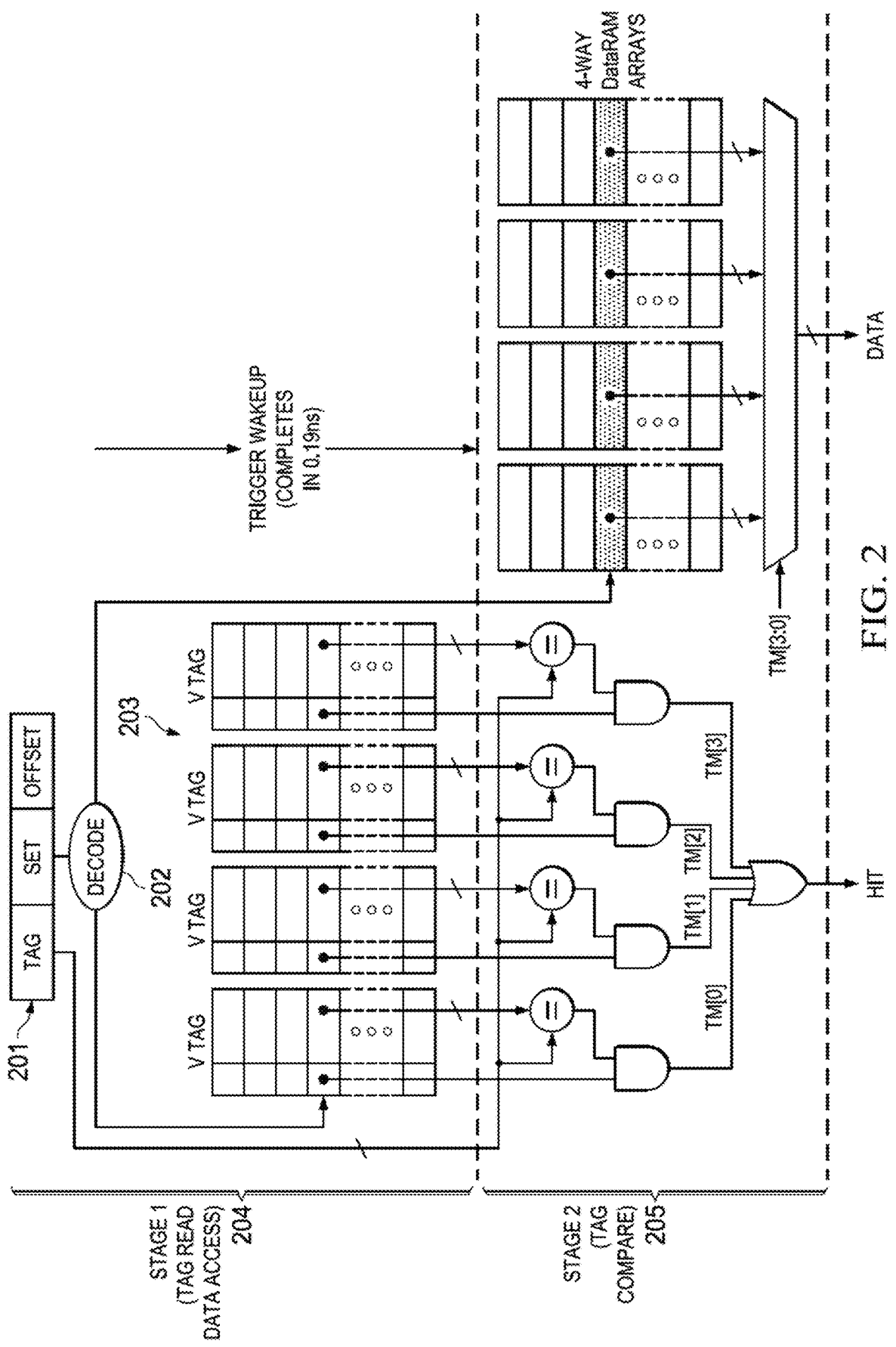
FIG. 2 shows implementation in a high performance 2-pipe stage architecture.
Figure 3:
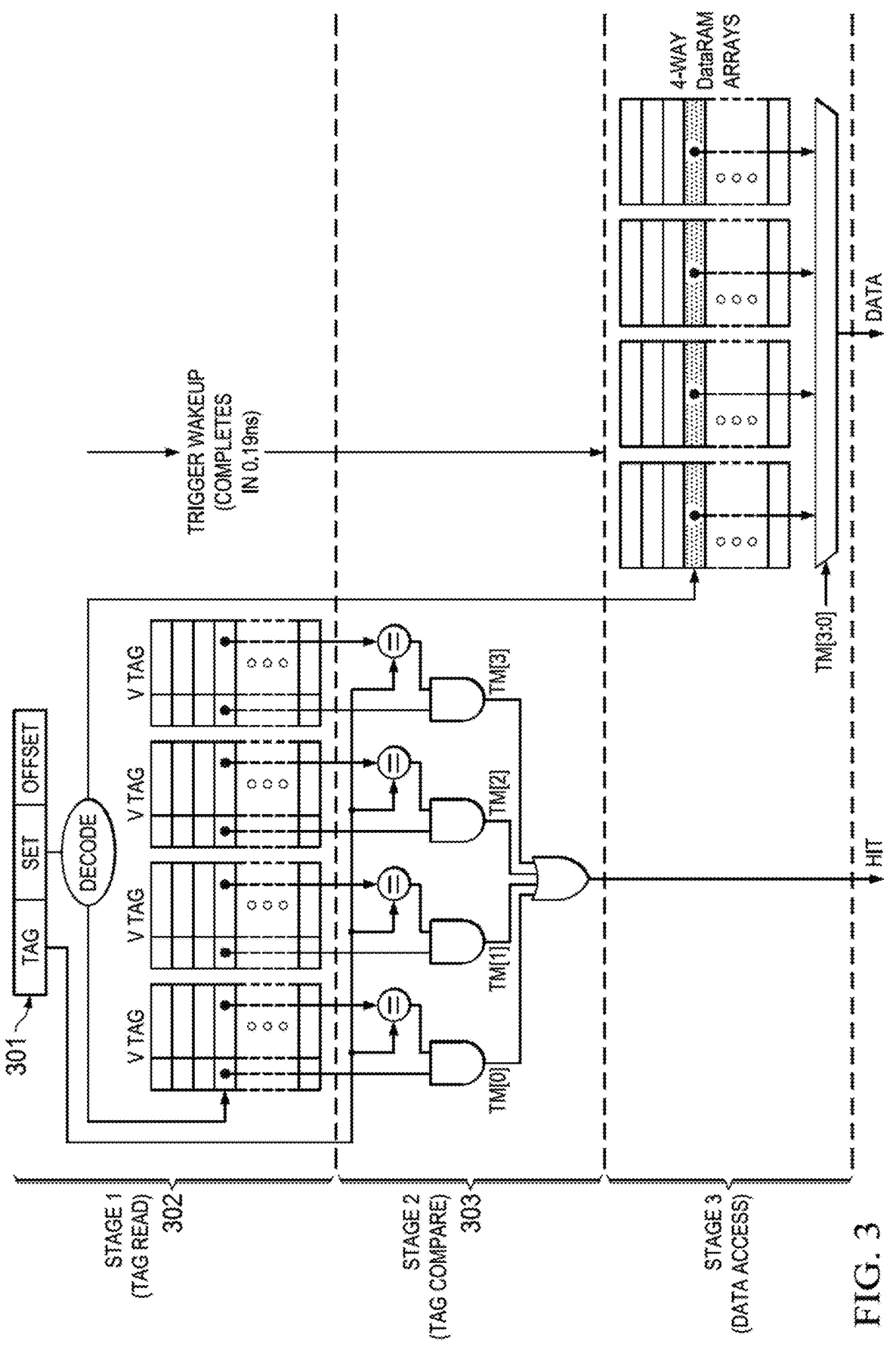
FIG. 3 shows implementation in a low power 3 pipe stage architecture.

The ease of integrating the dNap architecture with existing cache architectures is discussed as it relates to both high performance and low power architectures. First, FIG. 2 shows how the dNap cache integrates into an existing two pipe stage high performance architecture. On a new cache access, the set field 201 of address is decoded in decoder 202, followed by tag RAM 203 reading during the first pipe-stage 204. Data RAM reads are delayed to the next pipe-stage 205. Wake up from nap state is also triggered immediately after set decode while tag RAMs are being read. Second, FIG. 3 shows how the dNap cache integrates into an existing three pipe stage low power phased cache architecture. Wake up is triggered after decode of set field 301 as in their high performance counterparts, the difference being this low power architecture allows up to 2 pipe stages 302 and 303 to complete wake-up.

Deterministic napping at the individual cache line allows the maximum number data RAM lines to be kept in nap state, given individual cache line power can now be controlled independently. But this may not be easily achievable in some existing cache architectures which already use memory arrays that group multiple cache lines together for power and area savings. This is usually the case with vendor supplied memory arrays.

Figure 4:
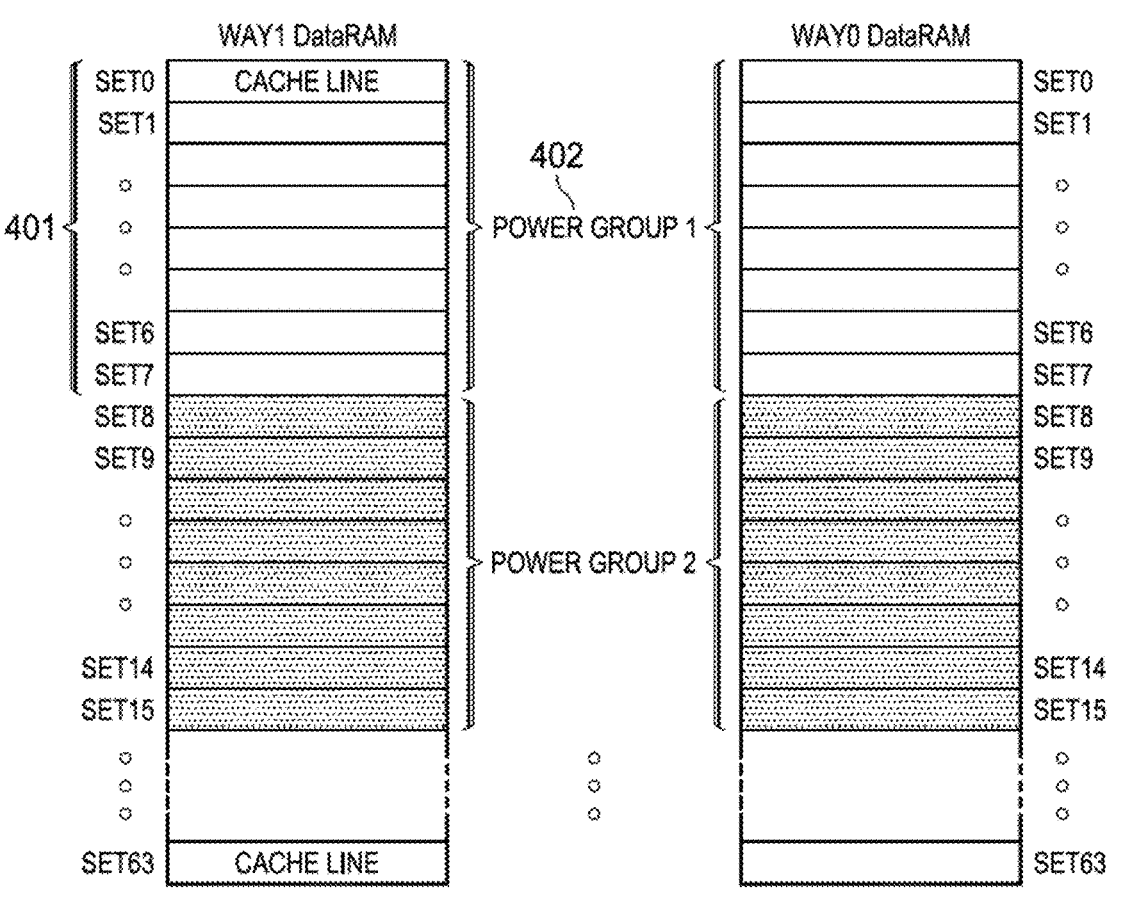
FIG. 4 shows a cache organized with power groups.

To enable the use of existing low power retention available in vendor memories, and to make the deterministic nap architecture more robust, deterministic napping is extended to contiguous cache line groups. The choice of contiguous cache lines is due to the spatial locality of access which suggests that the next contiguous line will most likely be accessed after the current one. Therefore, keeping these contiguous cache lines in the same power state benefits from the proposed deterministic napping scheme by reducing the triggers to transition between nap and full power states by the dNap power controller. For example, FIG. 4 shows an example of grouping eight cache lines 401 to single power group 402; this requires additional OR level for OR'ing the previously OR reduced outputs of sets0 through 7 as seen in FIG. 1.

Vendor supplied memories that already have a built-in low power retention state benefit more from this scheme because they do not need any extra nap state logic per cache line. The trade-off, on the other hand, is possible reduction in static power savings due to more cache lines effectively being fully powered as a result of the power groupings. For example, suppose we have a 2-Way set associative 8 KB cache with 32-byte lines, this cache would have 64 sets per way as seen in FIG. 4. Now, suppose we create groups of 8 cache lines each such that there are 8 power groups per way. Then, a new access to set 9 would trigger full power to all ways of the second group since the way requested is not known during the first cache pipe stage i.e., tag RAM access. Two cycles later, after hit/miss is determined, the hit way to be read from, or miss way to be allocated, is kept in full power state while the other ways are returned to a nap state if there is no new or pending access to the set and way group. The proposed dNap power groups do not span more than a cache way to enable maximum static power savings after hit/miss determination.

Power-performance trade off of deterministic napping at the individual cache line allows the maximum number of data RAM lines to be kept in Drowsy state, given individual cache line power can now be controlled independently. This offers the best static power savings possible in this architecture because only cache lines offsets to be accessed in the immediate future are fully powered. But this comes at the expense of extra hardware required to implement both the MNC and the individual nap power logic per cache line. Memory system architects can choose to group multiple cache lines into single memory banks to reduce this hardware overhead as needed. Also, to take advantage of the built-in low power feature available in some vendor supplied SRAM memory arrays, system architects can choose to fully power a memory array whenever there is at least an access to any of the lines of the SRAM array.

This eliminates most of the hardware overhead due to napping and wake-up implementation logic but offers lower static power savings because more cache lines are effectively fully powered. Given there are no readily available tools to evaluate static power consumption by dNap caches, we resolved to using Equation 1 for static power proposed by Butts and Sohi $$P_{static} = V_{cc} * N * K_{design} * I_{leak} \tag{1}$$

where: $V_{cc}$ is the supply voltage (Full power is 1.0 V, drowsy power is 0.3 V); N is the number of transistors; $K_{design}$ is a design dependent parameter; and $I_{leak}$ is the leakage current which is technology dependent. Since both N and $K_{design}$ remain constant in both drowsy and full power state, and we already have the $V_{cc}$ in these states, we evaluate the Drowsy state leakage current $I_{leak\_d}$ as a function of the full power leakage current $I_{leak}$ using Equation 2 based on the BSIM3 v3.2 equation for leakage.

$$I_{leak} = \mu_0 C_{ox} \frac{W}{L} e^{b(V_{dd}-V_{dd0})} V_t^2 \left(1 - e^{-\frac{V_{dd}}{V_t}}\right) e^{\frac{-|V_{th}|-V_{off}}{n*V_t}} \tag{2}$$

where: $\mu_0$ is the zero bias mobility; $C_{ox}$ is gate oxide capacitance per unit area, $$\frac{W}{L}$$

is the transistor aspect ratio; $e^{b(V_{dd}-V_{dd0})}$ is the DIBL factor derived from the curve fitting method; $V_{dd0}$ is the default supply voltage for the technology ($V_{dd0}$ is 1.0 V for 70 nm); $V_t$ is the thermal voltage; $V_{th}$ is threshold voltage which is also a function of temperature; n is the sub threshold swing coefficient; and $V_{off}$ is an empirically determined BSIM3 parameter which is also a function of threshold voltage. The quantities $\mu_0$, $C_{ox}$, $$\frac{W}{L}$$

and $V_{dd0}$ are statically defined parameters. The DIBL factor b, sub threshold swing coefficient, n and $V_{off}$ were derived from the curve fitting method based on the transistor level simulations. We calculate the leakage current in drowsy mode $I_{leak\_d}$ as a function of $I_{leak}$ as follows, where $V_{dd_d}$ is the drowsy mode voltage which is 0.3 V (i.e. 0.7 V less than $V_{dd}$) in our simulations.

$$I_{leak\_d} = I_{leak\_d} * \frac{I_{leak}}{I_{leak}} \tag{3}$$

$$= \frac{I_{leak\_d}}{I_{leak}} * I_{leak} \tag{4}$$

Since $\mu_0$, $C_{ox}$, $$\frac{W}{L}$$

and $V_{dd0}$ are static parameters, they cancel out yielding Equation 6.

$$I_{leak\_d} = \frac{e^{b(V_{dd_d}-V_{dd0})}}{e^{b(V_{dd}-V_{dd0})}} * \frac{1 - e^{-\frac{V_{dd_d}}{V_t}}}{1 - e^{-\frac{V_{dd}}{V_t}}} \tag{5}$$

$$= \frac{e^{b(-0.7+V_{dd}-V_{dd0})}}{e^{b(V_{dd}-V_{dd0})}} * \frac{1 - e^{-\frac{(-0.7+V_{dd})}{V_t}}}{1 - e^{-\frac{V_{dd}}{V_t}}} \tag{6}$$

The thermal voltage $V_t$ is $$\frac{KT}{q}$$

where: KT/q is the Boltzman constant $1.38088*10^{-23}$; q is $1.602*10^{-19}$; and T is chosen as 350 K rather than the default 300 K in the hot leakage tool to be consistent with Cacti toolset. We retain the default value of empirical parameter for $V_{dd}$, b=2.0 for the 70 nm node. Equation 6 therefore yields Equation 7 after substitution.

$$I_{leak\_d} = 0.24659 * I_{leak} \tag{7}$$

Equation 7 which is consistent with estimations is integrated into Cacti for drowsy leakage power evaluations.

Figure 5:
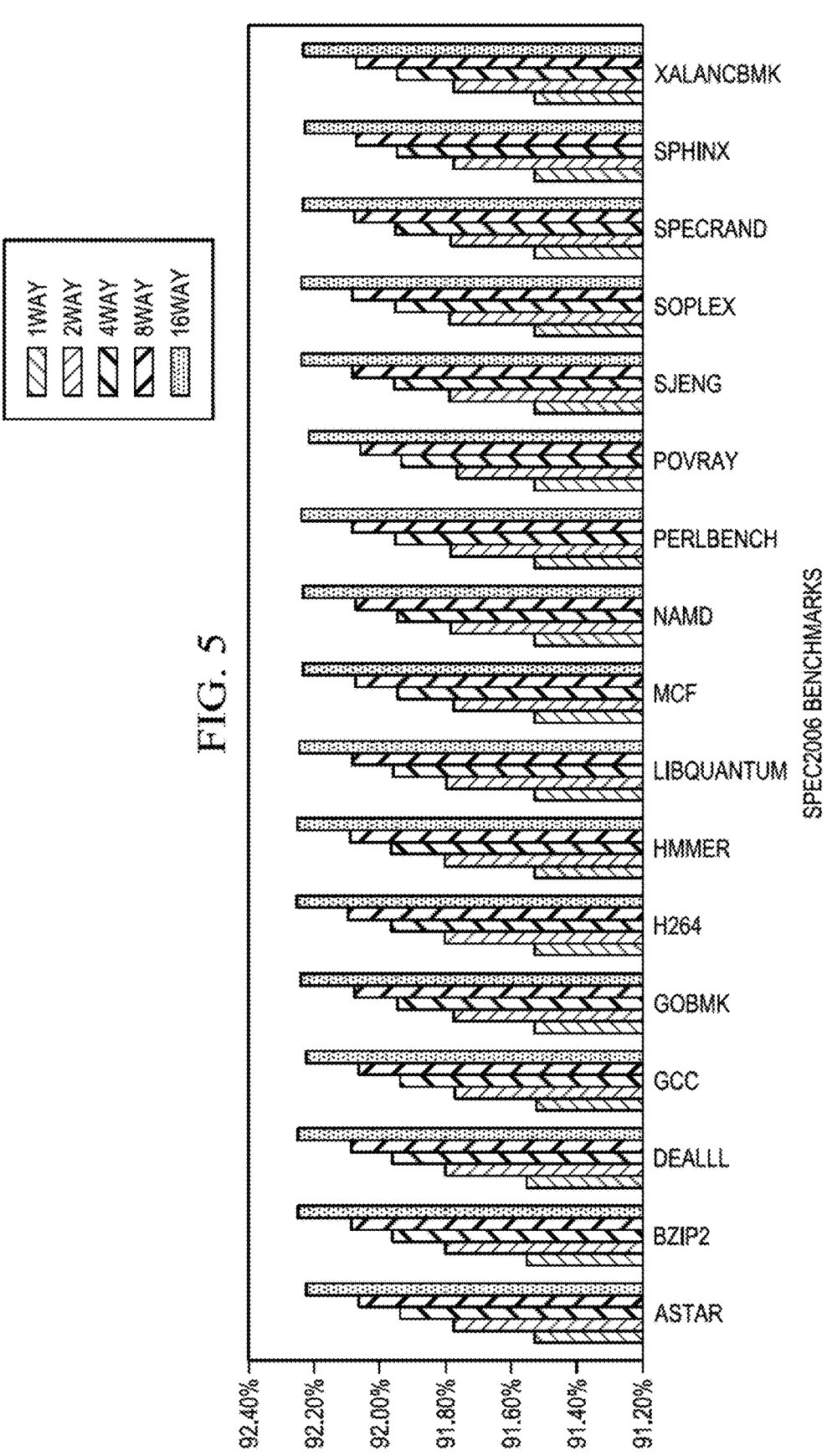
FIG. 5 shows leakage power savings in an L1I cache.

The static (or leakage) power on the dNap architecture was measured and compared against equivalently configured conventional caches. Simulations were run on 32 KB level 1 (L1) caches with one power enable per line (i.e., w=1), n=3 pipe-line stages and m=4 buffers, and it is expected that at most N ways (where N ways is set associativity) cache lines will be fully powered due to an access in stage 1 and 2, while only 1 cache line in stage 3 and each of the 4 buffers is fully powered in the presence of an access. This is consistent with simulation results, which show more than 92% leakage power savings using the dNap cache architecture. FIG. 5 shows the leakage power savings in a 32 KB L1 Instruction (L1I) cache with 32-byte cache lines and no power groups, compared to an equivalently sized conventional cache, across multiple cache associativities for various of the SEPC2006 benchmark programs. The increase in leakage power savings as set associativity increases is due to fewer sets which lead to less dNap hardware overhead as set associativity increases. This is summarized in Table 1 for an individual 32 KB cache and Table 2 at the processor core level. These two tables also show that the proposed dNap technique incurs similar hardware overheads in the existing DVS technique at higher associativities. This is because the number of sets reduce as associativity increases, thereby leading to fewer input and outputs on the decoder logic, and effectively, fewer OR gates.

TABLE 1

| Hardware Overhead Comparison in 32 KB Cache | | |
| --- | --- | --- |
| Associativity | DVS (%) | dNap (%) |
| 1 Way | +6.93 | +13.54 |
| 2 Way | +6.61 | +10.23 |
| 4 Way | +6.07 | +8.00 |
| 8 Way | +5.26 | +6.28 |
| 16 Way | +4.15 | +4.66 |

TABLE 2

| Hardware Overhead Comparison at Processor Core Level | | |
| --- | --- | --- |
| Associativity | DVS (%) | dNap (%) |
| 1 Way | +1.63 | +3.18 |
| 2 Way | +1.55 | +2.40 |
| 4 Way | +1.43 | +1.88 |
| 8 Way | +1.24 | +1.48 |
| 16 Way | +0.97 | +1.10 |

Figure 6:
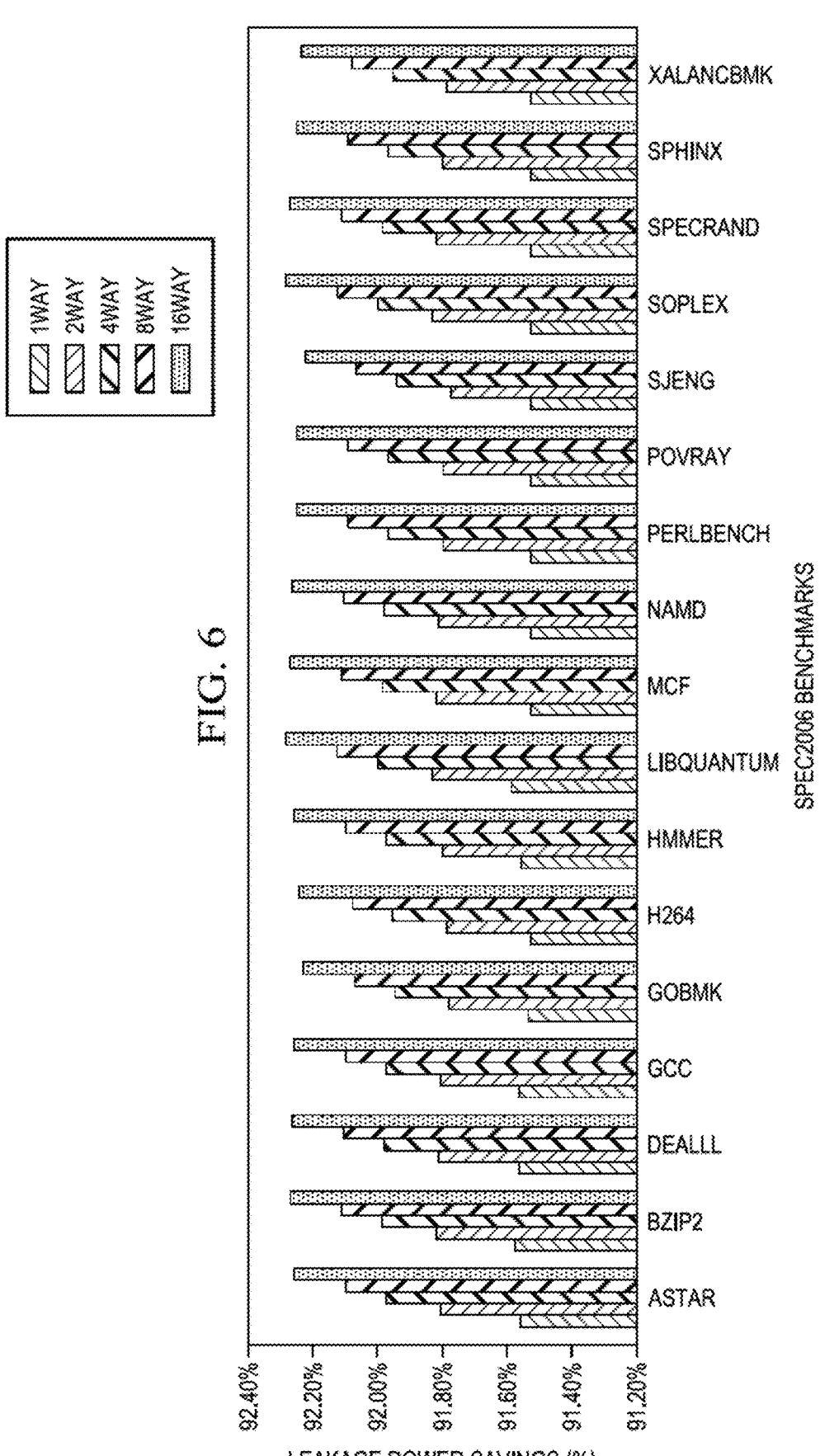
FIG. 6 shows leakage power savings in an L1D cache.

Simulation results indicate more than 92% leakage power savings is achievable with the proposed dNap cache architecture. FIG. 6 shows the leakage power savings in a 32 KB L1 Instruction (L1I) cache with 32-byte lines, compared to an equivalently sized conventional cache, for direct mapped through 16 Way set associativity for the same SPEC2006 benchmark programs used in FIG. 5. The increase in leakage power savings as set associativity increases is due to lower percentage hardware increase due to nap state implementation as set associativity increases as seen in Table 1. This rate of hardware reduction is greater than that of the increase in fully powered lines due to set associativity seen as in simulation results. This explains the consistent increase in leakage power savings with increasing associativity.

The dNap scheme shows a slightly better leakage power savings percentage in the L1 Data cache because there were fewer accesses to the L1D in the 500 million cycle simulation window across the benchmarks. This allows the L1D cache to have a higher proportion of cache lines in nap state during program execution.

The significant static power savings (more than 90%) due to the dNap architecture does not vary much across different associativities, because the number of fully powered cache lines only varies in the first 2 cache pipe-stages before hit/miss way is known. This difference is less than 1% because simulation configurations use 1024 cache lines (i.e., 32 KB cache, 32 byte lines), and the maximum number of extra lines in the 16 Way cache configuration are the 15 extra ways in the first 2 pipe stages before hit/miss determination. This results in only 30 extra cache lines fully powered out of 1024 lines versus the direct mapped cache alternative.

Also, there can only be a maximum of "2*N ways+n–2+ m" fully powered lines at any given cycle during program execution in the proposed dNap architecture, where N ways is associativity, n is the number of pipe-stages and m is the number of buffers. This suggests that the performance of the dNap technique will show only negligible variations in static/leakage power savings as reflected in FIGS. 5 and 6. For example, for N ways=16, n= and m=4, the number of fully powered lines in any cycle, varies from none, to a maximum of 37 of the total 1024 cache lines leading to over 90% power savings.

Figure 7:
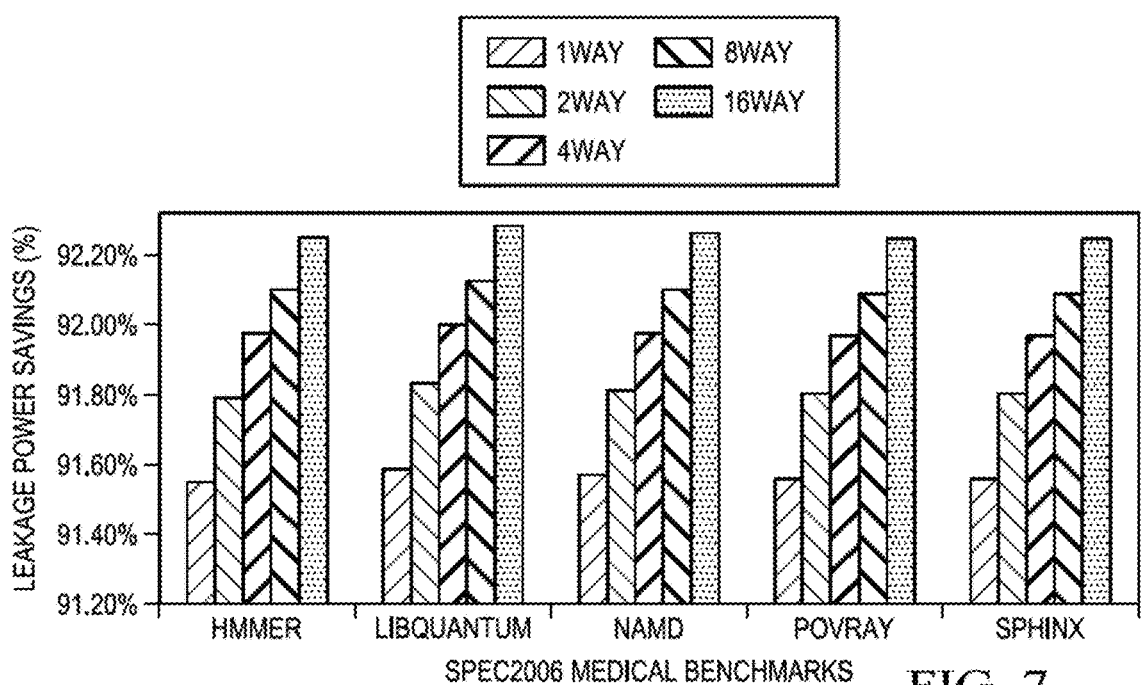
FIG. 7 shows leakage power savings in an L1D cache.

The static power reduction benefits of deterministic napping is also evaluated in low power wearable medical devices. FIG. 7 is focused on the medical applications of SPEC2006 processor benchmark. These include: hmmer which is used in computational biology to search for patterns in DNA sequences; libquantum, used in human cryptography; namd, a parallel program used in the simulation of large bio-molecular systems; povray, used to calculate and simulate the way rays of light travel and hit the human eye; and sphinx, a widely known speech recognition program. The significant dNap static power savings do not vary much across different associativities and applications, because there can only be a maximum of "2*Nways+m+n–2" fully powered lines at any given cycle during program execution, where n and m are the pipe-stage and buffer depths, respectively. This is because tag access and comparison occurs in the first 2 cycles and all cache ways (2*N ways) must be fully powered before a single hit/miss way is determined. Beyond that, accesses in other pipe-line stages and buffer (i.e., m+n–2) keep only the cache hit/miss way of the referenced set in full power state. This explains the minor variations in leakage power savings across applications.

Also, there can only be a maximum of "2*N ways+n–2+ m" fully powered lines at any given cycle during program execution in the proposed dNap architecture, where N ways is associativity, n is the number of pipe-stages and m is the number of buffers. This suggests that the performance of the dNap technique will show only negligible variations in static/leakage power savings as reflected in FIGS. 5 and 6. For example, for N ways=16, n=3 and m=4, the number of fully powered lines in any cycle, varies from none, to a maximum of 37 of the total 1024 cache lines leading to over 90% power savings.

The overall leakage power reduction across the cache hierarchy is further evaluated while highlighting the effect of dNap logic and dynamic power due to nap state transitions. This was achieved using the default Intel configuration in the sniper simulator, with 64-byte cache lines, 32 KB L1I and L1D with 4-Way and 8-Way associativity respectively. The L2 and L3 were configured as 8-Way 256 KB and 16-Way 32 MB respectively. The McPAT power measurements are summarized in Table 3. It shows the overhead due to nap state transitions are negligible while dNap power savings are still significant, with the highest power contribution due to the always fully powered dNap logic.

TABLE 3

| Total Leakage Power in L1s, L2 and L3 | | | | | |
| --- | --- | --- | --- | --- | --- |
| | dNap Cache Power (W) | | | Conv. | Savings |
| Benchmarks | Wake | logic | other | (W) | (%) |
| hmmer | 0.00031 | 1.86 | 1.00 | 9.16 | 68.68 |
| libquantum | 0.00006 | 1.86 | 0.97 | 9.16 | 69.06 |
| namd | 0.00014 | 1.86 | 0.98 | 9.16 | 68.91 |
| povray | 0.00017 | 1.86 | 0.97 | 9.16 | 68.98 |
| sphinx3 | 0.00014 | 1.86 | 0.98 | 9.16 | 68.96 |

Figure 8:
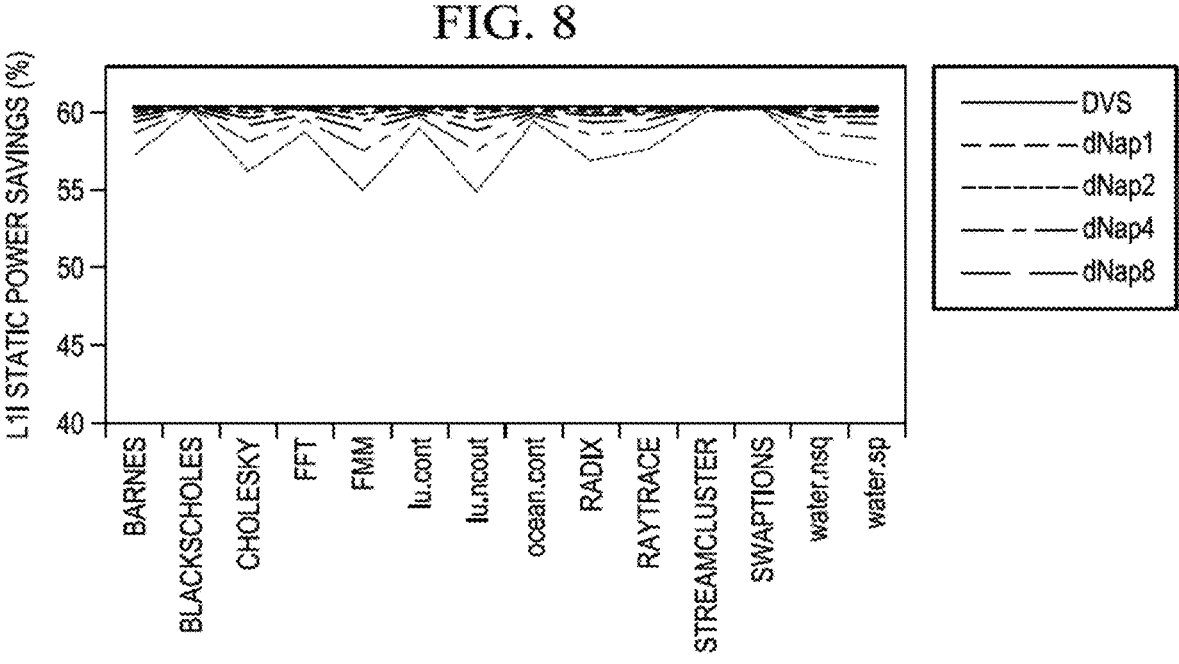
FIG. 8 shows static power savings in an L1I cache.

Leakage (or static) power reduction due to dNaps was also evaluated in a multi core environment. FIG. 8 shows the total static power reduction in all L1 Instruction caches across a 4-core processor for various benchmark programs. The result is significant static power reduction which does not exceed those of the DVS technique. This is because the compared flavor of DVS technique waits until access reaches the data RAM before waking up the RAMs; as a result, the DVS is in lower power state for longer periods than the dNap technique. The dNap however, does not incur the performance penalty of the DVS for the static power savings it offers.

Figure 9:
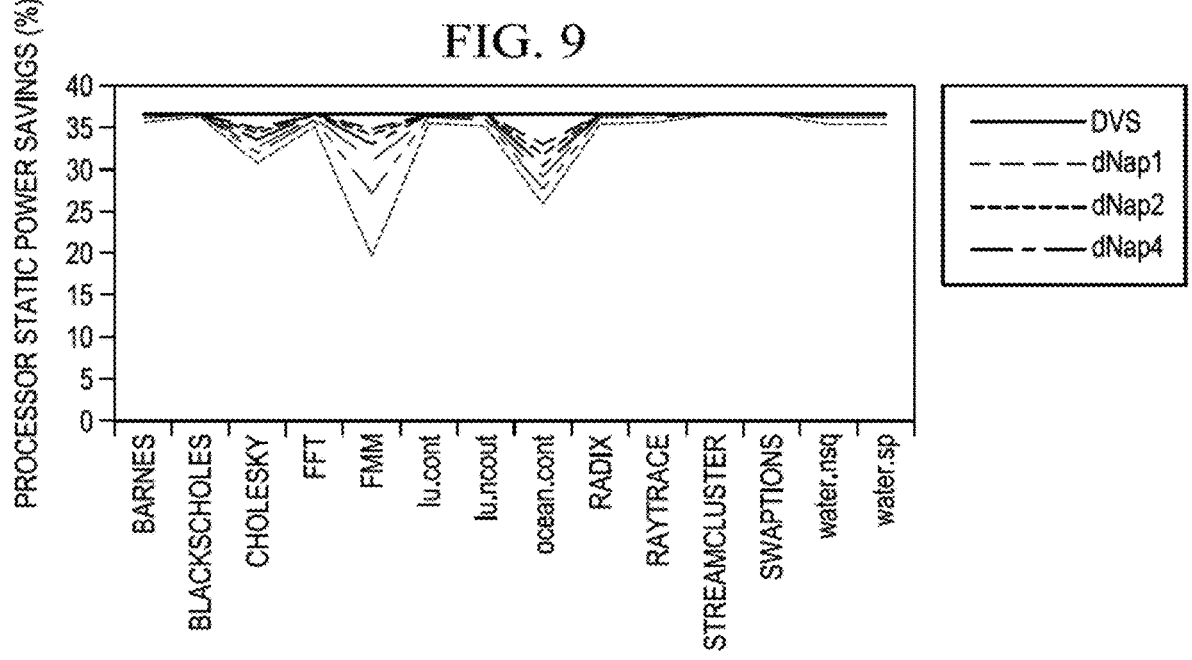
FIG. 9 shows static power savings in a 4 core processor.

FIG. 9 shows a similar trend in static power savings at the 4-core processor level for the same benchmark programs used in FIG. 8. The only difference being a lower static power reduction, due to other processor components not participating in deterministic napping.

It is worth noting that more cache lines per dNap group leads to fewer wake-up transitions due to more fully powered lines over the course of program execution. It was also observed that all power groups in all benchmarks evaluated in this work, completely transitioned in and out of nap state within a single clock cycle.

Both the Simple scalar toolset and Cacti v6.5 toolset was used as the basis of the simulator development for static power evaluation. While there are multiple flavors of these tools, none completely model the architectural technique shown in this invention. Therefore, a robust simulator was developed using both existing tools as basis. The state of all cache lines are tracked per cycle and the static power for each line is computed using Equations 1 and 7. The total static energy for 500 million cycles of simulation was collected for different 32 KB cache configurations on SPEC2006 benchmarks and compared with conventional non-drowsy caches. Table 4 gives a brief summary of the default configurations used across all of the simulations.

TABLE 4

Simulation Configuration

| Parameters | Value |
|---|---|
| Instruction Fetch Queue Size | 4 Instructions |
| Instruction Decode Width | 4 Instructions Per Cycle |
| Instruction Issue | 4 Instructions Per Cycle |
| L1 Instruction Cache Latency | 3 cycles |
| L1 Data Cache Latency | 3 cycles |
| L2 Unified Cache Latency | 11 cycles |
| Main Memory Latency | 26 cycles |
| TLB Miss Latency | 30 cycles |
| Memory Access Width | 32 Bytes |

What is claimed is:

1. A memory system comprising:
a memory including cache lines; and
decoding and logic circuitry coupled to the memory, wherein the decoding and logic circuitry is configured to:
receive a memory access request,
decode an address associated with the memory access request to determine a first subset of the cache lines to which the memory access request is directed,
cause transition of the first subset of the cache lines from a low power state to an operating state, and
determine that the memory access request is associated with a hit in a second subset of the cache lines, the second subset of the cache lines being a subset of the first subset of the cache lines, and in response thereto, transition a third subset of the cache lines from the operating state to the low power state, the third subset of the cache lines being a subset of the first subset of cache lines and mutually exclusive of the second subset of the cache lines.

2. The memory system of claim 1, wherein the decoding and logic circuitry is configured to determine the first subset of the cache lines to which the memory access request is directed based on a portion of the address.

3. The memory system of claim 1, wherein the decoding and logic circuitry is configured to:
execute the memory access request on the second subset of the cache lines, including a first cache line; and
transition the subset of the cache lines from the operating state to the low power state while executing the memory access request on a first cache line of the second subset of the cache lines.

4. The memory system of claim 1, wherein the decoding and logic circuitry is configured to determine the first subset of the cache lines to which the memory access request is directed in a first clock cycle.

5. The memory system of claim 4, wherein the decoding and logic circuitry is configured to cause transition of the first subset of the cache lines from the low power state to the operating state in a second clock cycle.

6. The memory system of claim 3, wherein the decoding and logic circuitry is configured to transition the second subset of the cache lines upon completing execution of the memory access request.

7. The memory system of claim 1, further comprising:
a controller including the decoding and logic circuitry.

8. The memory system of claim 7, wherein the controller is configured to:
perform, in a first stage, a tag read of the memory access request to determine the first subset of the cache lines to which the memory access request is directed; and
perform, in a second stage, a tag comparison on the memory access request and a result of the tag read to determine that the memory access request is associated with a hit in the second subset of the cache lines.

9. The memory system of claim 8, wherein the controller is configured to:
perform, in a third stage, the memory access request on a first cache line; and
maintain the first cache line in the operating state while a result of the memory access request is stored in the third stage.

10. The memory system of claim 1, wherein:
the memory access request includes one of a read access and a write access.

11. A memory system, comprising:
a tag memory and a data memory having cache lines, wherein the data memory is configured to be accessed to retrieve data in a plurality of addressable locations of the data memory in response to cache access requests, each cache access request including a request address;
decoder circuitry configured to receive bits related to the requested addresses, decode the bits, and output a set of decoded output signals; and
logic circuitry configured to receive the sets of decoded output signals from the decoder circuitry and to output respective power enable signals, including a first power enable signal,
wherein a first group of cache lines of the data memory is controllable to be in one of an operating state and a lower power state in response to the first power enable signal, and wherein the first power enable signal is generated based on multiple power enable signals, which is at least a subset of all of the power enable signals output by the logic circuitry.

12. The memory system of claim 11, wherein the first group of cache lines of the data memory is controlled to be in the operating state before cache lines in the first group of cache lines are accessed.

13. The memory system of claim 12, wherein the cache lines of the data memory are arranged in cache ways, and after it is determined that a cache hit has occurred in a single cache way, all cache lines of the first group of cache lines of unselected cache ways are transitioned to the low power state.

14. The memory system of claim 12, wherein the cache lines of the data memory are arranged in cache ways, and after it determined that a cache hit has occurred in a single cache way, all cache lines of the first group of cache lines of unselected cache ways that are not requested in a new cache access request are transitioned to the low power state.

15. The memory system of claim 11, wherein the memory system is configured as n pipelined cache stages and m buffers, such that the memory system is configured to receive n+m cache access requests, where n is unequal to m.

16. The memory system of claim 15, wherein the decoder circuitry includes d decoders, in which d=n+m.

17. The memory system of claim 11, wherein the logic circuitry includes a plurality of logic OR gates.

18. The memory system of claim 11, wherein the cache lines of the data memory are arranged in cache ways, and the memory system is configured such that, for each cache access request, a tag read of the cache access request is performed in a first stage to generate a tag read result; and the cache access request is compared to the tag read result in a second stage to determine that the cache access request is associated with a cache hit in a single cache way.

19. The memory system of claim 18, wherein, for each cache access request, the cache access request is performed on a first cache line of the single cache way in a third stage; and the memory system is configured to maintain the first cache line in the operating state while a result of the cache access request is stored in the third stage.

20. The memory system of claim 11, wherein:

the cache access request includes one of a read access and a write access.

* * * * *